United States Patent
Nagasawa

(10) Patent No.: US 12,472,897 B2
(45) Date of Patent: Nov. 18, 2025

(54) VEHICLE BODY FRONT STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 407 days.

(21) Appl. No.: 18/317,357

(22) Filed: May 15, 2023

(65) Prior Publication Data

US 2023/0382333 A1   Nov. 30, 2023

(30) Foreign Application Priority Data

May 31, 2022  (JP) .................................. 2022-089137

(51) Int. Cl.
*B60R 19/24* (2006.01)
*B60R 19/18* (2006.01)
*B62D 25/08* (2006.01)

(52) U.S. Cl.
CPC ............. *B60R 19/24* (2013.01); *B60R 19/18* (2013.01); *B62D 25/08* (2013.01); *B60R 2019/1806* (2013.01); *B60R 2019/247* (2013.01)

(58) Field of Classification Search
CPC . B60R 19/18; B60R 19/24; B60R 2019/1806; B60R 2019/247; B62D 21/152; B62D 25/08

See application file for complete search history.

(56) References Cited

U.S. PATENT DOCUMENTS

| 2012/0248820 A1* | 10/2012 | Yasui .................. B62D 21/152 296/193.09 |
| 2019/0299889 A1* | 10/2019 | Wada ....................... B60R 19/34 |
| 2021/0114664 A1* | 4/2021 | Baccouche .......... B62D 21/152 |

FOREIGN PATENT DOCUMENTS

| JP | 2017-047780 A | 3/2017 |
| WO | WO-9218801 A1 * | 10/1992 ............ E01F 15/141 |

OTHER PUBLICATIONS

JP 2013121815 A (Year: 2013).*
DE 102012221194 A1 (Year: 2014).*
EP 3213966 A1 (Year: 2017).*
KR 20210137753 A (Year: 2021).*

* cited by examiner

*Primary Examiner* — Lori Lyjak
(74) *Attorney, Agent, or Firm* — Smith, Gambrell & Russell, LLP

(57) ABSTRACT

A vehicle body front structure includes: front side frames in a pair; a cross member; a bumper beam, a reinforce having one end coupled to a bent portion of the bumper beam and another end extending to a joint where one of the front side frames and the cross member are coupled to each other; and truss chassis members. Each truss chassis member includes, as vertices: a first pinned support pivotally fixed in the cross member; a second pinned support movable and rotatable, and disposed in the joint between the corresponding front side frame and the cross member; and a third pinned support movable and rotatable, and disposed in the corresponding front side frame and closer to a rear of the vehicle than the second pinned support. The reinforce is secured to the front side frame and the cross member via the truss chassis member.

4 Claims, 6 Drawing Sheets

VEHICLE BODY FRONT STRUCTURE

CROSS-REFERENCE TO RELATED APPLICATIONS

The present application claims priority from Japanese Patent Application No. 2022-089137 filed on May 31, 2022, the entire contents of which are hereby incorporated by reference.

BACKGROUND

The disclosure relates to a vehicle body front structure.

Generally, in a frontal collision of a vehicle, in order to reduce injury to an occupant, it is effective to prevent deformation of a cabin, which is an occupant boarding space. For this purpose, various devices have been provided. In recent years, as one of these devices, a structure forward of the cabin and configured to absorb collision energy has prevailed.

Meanwhile, when the vehicle is a hybrid vehicle, an electric vehicle or the like, a battery pack as a power source of the vehicle is mounted on a bottom surface under the cabin in some cases.

Power to drive the vehicle is stored in the battery pack. When deformation or disconnection of the battery pack occurs due to a frontal collision of the vehicle, for example, there is also a possibility of inducing a drastic abnormal reaction. In this respect, there is room for improvement.

Therefore, in the case of a hybrid vehicle, an electric vehicle or the like, a degree of importance of the structure configured to prevent deformation of the cabin has been increased not to damage the battery pack.

Concerning a frontal collision of a vehicle, multiple collision modes are to be considered, for example, a full wrap frontal collision in which a whole front surface of the vehicle collides with a collision object, an offset collision in which one side of the front surface of the vehicle collides with the collision object, and a small overlap collision having an offset rate of approximately 25%.

Therefore, in each of the collision modes, there has been a demand for a structure forward of a cabin or a battery pack and configured to absorb collision energy so as not to deform the cabin and the battery pack.

In response to this demand, a structure including the following is proposed: a bumper reinforcement (bumper beam) extending in a front part of a vehicle in a vehicle width direction; a pair of left and right side rails (front side frames) extending in a vehicle fore-and-aft direction on both sides in the vehicle width direction; and braces (reinforces) coupled to portions of the bumper beam that are at vehicle outer sides of the front side frames. When collision energy due to a small overlap collision is generated on one side in the vehicle width direction, the reinforce on the one side engages with a load receiver disposed on the front side frame, so that a load is transmitted to the front side frame on the other side in the vehicle width direction via a cross member (see, for example, Japanese Unexamined Patent Application Publication (JP-A) No. 2017-047780).

SUMMARY

An aspect of the disclosure provides a vehicle body front structure for a vehicle. The vehicle body front structure includes front side frames in a pair, a cross member, a bumper beam, a reinforce, and truss chassis members. The front side frames are disposed in a front part of the vehicle and respectively on both sides in a vehicle width direction of the vehicle. The front side frames extend in a fore-and-aft direction of the vehicle. The cross member extends in the vehicle width direction at a front of the vehicle and coupled to the front side frames. The bumper beam is disposed on respective end portions of the front side frames at the front of the vehicle and extends in the vehicle width direction. Both ends of the bumper beam includes respective bent portions bent toward a rear of the vehicle. The reinforce has one end coupled to one of the bent portions of the bumper beam, and another end extending to a joint where one of the front side frames and the cross member are coupled to each other. The truss chassis members include one of the truss chassis members disposed on respective upper surfaces of the one of the front side frames and the cross member and another of the truss chassis members disposed on lower surfaces of the one of the front side frames and the cross member. Each of the truss chassis members has a triangular shape includes, as vertices thereof, a first pinned support, a second pinned support, and a third pinned support. The first pinned support is pivotally fixed in the cross member. The second pinned support is movable and rotatable, and disposed in the joint. The third pinned support is movable and rotatable, and disposed in a corresponding one of the front side frames and closer to the rear of the vehicle than the second pinned support. The reinforce is secured to the one of the front side frames and the cross member via a corresponding one of the truss chassis members.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 4A is a plan view prior to the collision, and FIG. 4B and FIG. 4C are plan views illustrating the deformation during the frontal collision as time elapses.

FIG. 5A is a plan view prior to the collision, and FIG. 5B and FIG. 5C are plan views illustrating the deformation during the frontal collision as time elapses.

DETAILED DESCRIPTION

Figure 1:
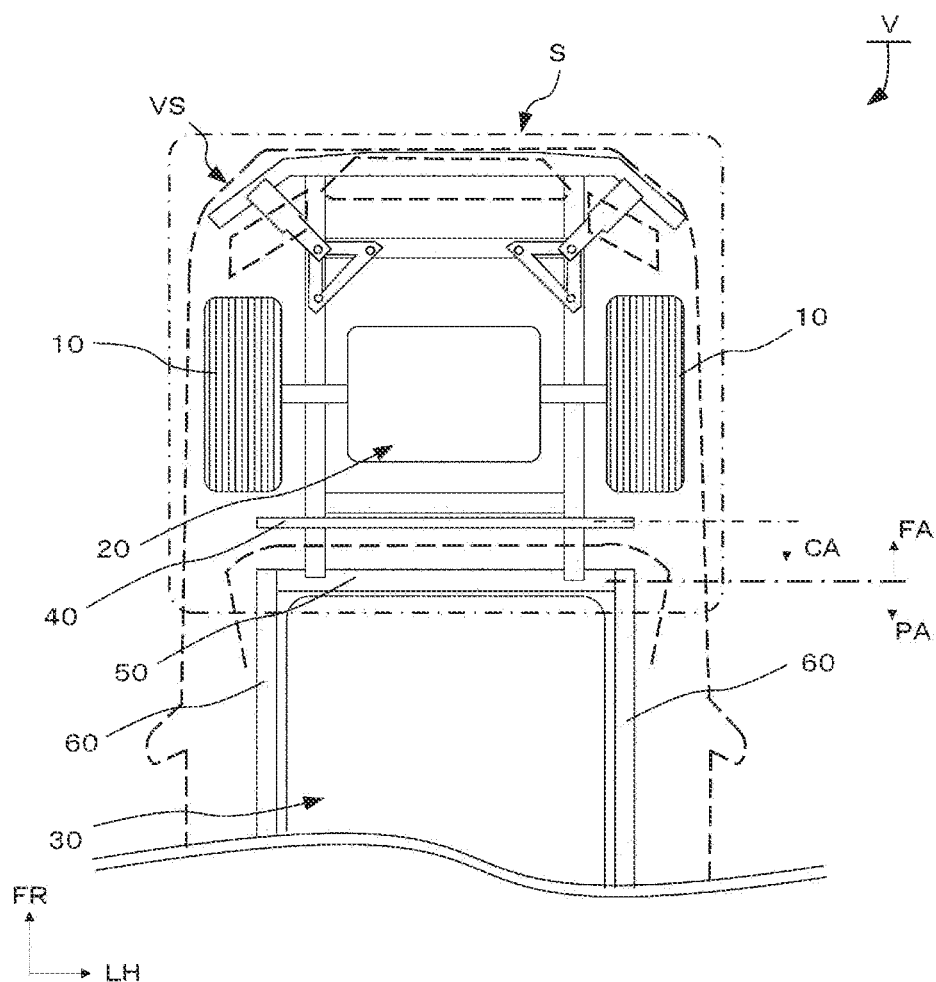
FIG. 1 is a diagram illustrating a configuration of a vehicle according to an embodiment of the disclosure, as viewed from above.

In the technique disclosed in JP-A No. 2017-047780, the reinforce presses the load receiver disposed on the front side frame, so that the reinforce performs transmission of collision energy generated by a small overlap collision to the front side frames and the cross member. A direction of the transmission is limited to a rearward direction or lateral and rearward directions. Consequently, there is a possibility that the collision energy is not dispersed and transmitted efficiently. In this respect, there is room for improvement.

It is desirable to provide a vehicle body front structure that can prevent deformation of the cabin and the battery pack even in the multiple frontal collision modes.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Hereinafter, referring to FIG. 1 to FIG. 7, a description will be given on a vehicle V to which a vehicle body front structure S according to an embodiment of the disclosure is applied. It is noted that as illustrated for convenience in the drawings, arrow FR indicates forward (front) of the vehicle V illustrated in FIG. 1, arrow UP indicates upward of the vehicle V in a front view, and arrow LH indicates leftward of the vehicle V in a front view. In the following description, a vertical direction, a fore-and-aft direction, and a lateral direction are used to respectively indicate a vertical direction in a front view, a fore-and-aft direction in a front view, and a lateral direction in a front view unless specified otherwise.

Embodiment

Figure 2:
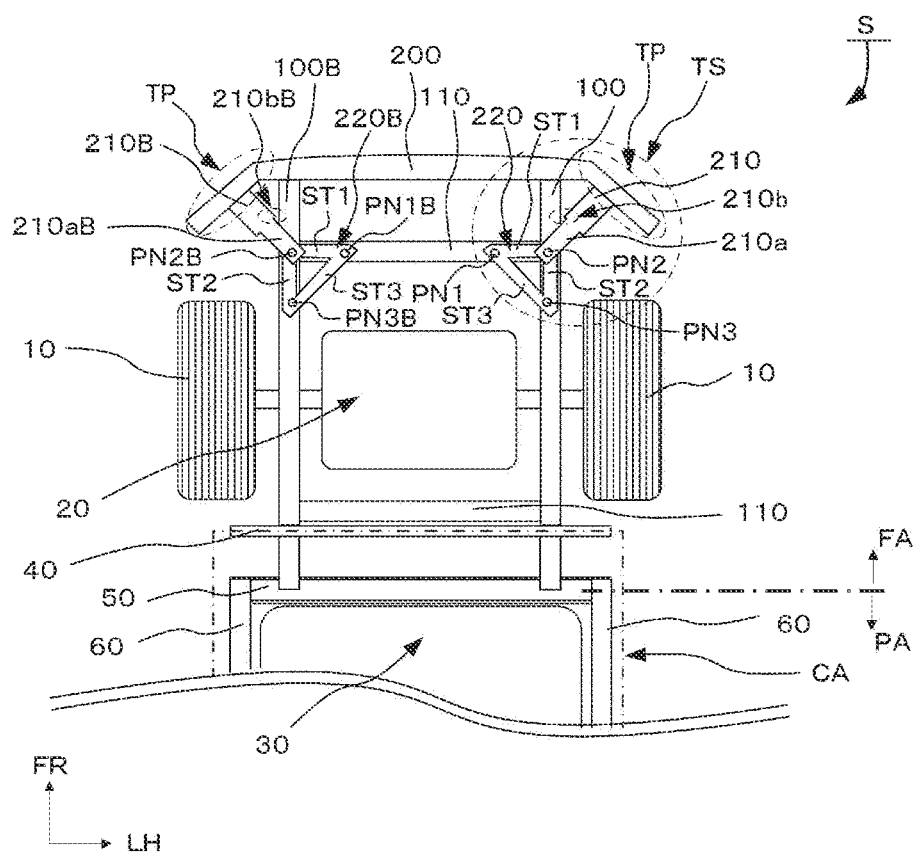
FIG. 2 is a diagram illustrating a configuration of a vehicle body front structure illustrated in FIG. 1, as viewed from above.
Figure 3:
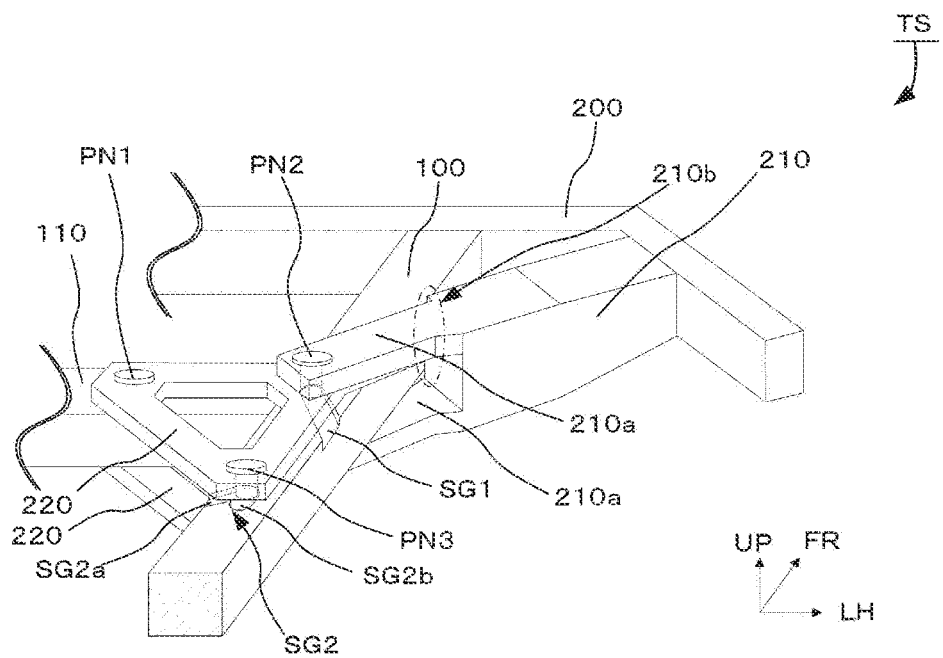
FIG. 3 is a perspective view of area TS illustrated in FIG. 2, as viewed from above.

Referring to FIG. 1 to FIG. 3, a configuration of the vehicle body front structure S according to the embodiment provided for the vehicle V will be described.
Configuration of Vehicle V The vehicle V is, for example, an electric vehicle including a power unit 20 as a drive source. However, the vehicle V may be, for example, a hybrid electric vehicle including an engine and the power unit 20 as drive sources.

As illustrated in FIG. 1, the vehicle V includes, inside a vehicle body VS, front wheels 10, the power unit 20, a battery pack 30, a toeboard 40, a torque box 50, side sills 60, and the vehicle body front structure S (diagonally shadowed portions surrounded by the single chain line in FIG.

The power unit 20 is a drive device configured to drive the front wheels 10 and including components, not illustrated, such as a motor, a transmission, a clutch, and a drive shaft. The power unit 20 is disposed in a space surrounded by front side frames 100, 100B and cross members 110, described later. The power unit 20 is placed on and secured to upper surfaces of the front side frames 100, 100B.

The battery pack 30 has a flat box shape, for example. Inside the battery pack 30, a large number of battery cells are connected in series. The battery pack 30 is capable of outputting high voltage supplied to the power unit 20, and stores power used for vehicle travel. The battery pack 30 is disposed in a space surrounded by rigid frames, such as the torque box 50 and the side sills 60, described later. The battery pack 30 is used in a vehicle, such as an electric vehicle (EV) and a hybrid electric vehicle (HEV).

The toeboard 40 is a partition wall standing in the vertical direction in front of a cabin CA so as to separate the front wheel drive device and the cabin CA of the vehicle V from each other. The toeboard 40 is coupled to upper sides of rear portions of the front side frames 100, 100B, described later, by welding, for example.

The torque box 50 is a component interposed between the front side frames 100, 100B and the side sills 60, described later, and configured to couple the front side frames 100, 100B and the side sills 60 to each other. The torque box 50 is a framework extending on a bottom surface of the vehicle V in a vehicle width direction, and is coupled to one end portion of each of the front side frames 100, 100B on both sides of the torque box 50 in the vehicle width direction by welding, for example. The torque box 50 is made of a material such as a metal of high rigidity, and has a substantially rectangular closed cross-sectional shape. The torque box 50 is located forward of the battery pack 30, and each end portion of the torque box 50 is coupled to one end portion of each of the side sills 60 on both sides of the torque box 50 in the vehicle width direction by welding, for example.

The one end portion of each of the front side frames 100, 100B on both sides of the torque box 50 in the vehicle width direction is coupled to a vehicle front surface side and an upper surface side of the torque box 50 by welding, for example.

It is noted that an area on a vehicle rear side with respect to the torque box 50 is a protection area PA configured to prevent deformation of the cabin CA located above the protection area PA and the battery pack 30 located below the protection area PA.

The side sills 60 are disposed on the bottom surface of the vehicle V on both sides in the vehicle width direction. Each of the side sills 60 is a framework extending in the vehicle fore-and-aft direction, is made of a material such as a metal of high rigidity, and has a substantially rectangular closed cross-sectional shape. The side sills 60 constitute bottom sides of the protection area PA on both sides.

The vehicle body front structure S is disposed inside a vehicle front compartment FA forward of the torque box 50. A configuration of the vehicle body front structure S will be described below.
Configuration of Vehicle Body Front Structure S Referring to FIG. 2 and FIG. 3, the vehicle body front structure S according to the embodiment will be described.

The vehicle body front structure S is in lateral symmetry in the vehicle width directions of the vehicle V.

As illustrated in FIG. 2, the vehicle body front structure S includes: a front side frame 100 on a first side in the vehicle width direction (and a front side frame 100B on a second side in the vehicle width direction); cross members 110; a bumper beam 200; a reinforce 210 on the first side in the vehicle width direction (and a reinforce 210B on the second side in the vehicle width direction); and truss chassis members 220 on the first side in the vehicle width direction (and truss chassis members 220B on the second side in the vehicle width direction).

The front side frames 100, 100B are provided in a pair in the vehicle width direction in a front part of the vehicle V. The front side frames 100, 100B are located at sides of the power unit 20 configured to drive the front wheels 10 of the vehicle V, and extend in the vehicle fore-and-aft direction.

The front side frames 100, 100B constitute a framework of the vehicle V, and are made of a material such as a metal of high rigidity. Each of the front side frames 100, 100B has a substantially rectangular closed cross-sectional shape. For convenience, the front side frame 100 and associated components therewith on the first side in the vehicle width direction will be mainly described below. An end portion of the front side frame 100 on a vehicle front side is coupled to the bumper beam 200 by welding, for example, whereas an end portion of the front side frame 100 on a vehicle rear side is coupled to the torque box 50 by welding, for example.

The cross members 110 extend in the vehicle width direction at the front and the rear of the power unit 20, and both end portions of each of the cross members 110 are coupled to the front side frames 100, 100B on both sides in the vehicle width direction by welding, for example. The cross members 110 are made of a material such as a metal, and each have a substantially rectangular closed cross-sectional shape.

The bumper beam 200 extends in the vehicle width direction at the vehicle front side and constitutes a framework at the vehicle front side. The bumper beam 200 is made of a material such as a metal, and has a substantially rectangular closed cross-sectional shape. The bumper beam 200 is coupled to front end portions of the front side frames 100, 100B on both sides in the vehicle width direction by welding, for example. End portions of the bumper beam 200 that are outward of joints with the front side frames 100, 100B in the vehicle width directions are bent at bent portions TP toward the vehicle rear side. Moreover, a center portion of the bumper beam 200 in the vehicle width direction is curved in such a manner that the center portion is in a convex shape toward the vehicle front side in a plan view.

In the vehicle body front structure S, a rigid framework of a number-sign shape of double crosses intersecting each other in parallel is formed by coupling the front side frames 100, 100B on both sides in the vehicle width direction, the cross members 110 disposed at the vehicle front and rear of the power unit 20, the bumper beam 200, the torque box 50, and the side sills 60 to one another.

The reinforces 210, 210B are made of a material such as a metal, and each have a substantially rectangular closed cross section. For convenience, the reinforce 210 and associated components therewith on the first side in the vehicle width direction will be mainly described below. The reinforce 210 has a substantially bar shape. One end of the reinforce 210 is coupled to a vehicle inner surface of the bent portion TP of the bumper beam 200 by welding, for example, and extends toward the joint between the front side frame 100 and the cross member 110. At the other end of the reinforce 210, joints 210a (joints 210aB on the second side in the vehicle width direction) are formed on an upper surface side and a lower surface side of the reinforce 210. Each of the joints 210a projects toward the joint between the front side frame 100 and the cross member 110, and has a substantially bar shape of a substantially rectangular solid cross section. A through hole of a substantially circular shape, not illustrated, is formed vertically through a distal end portion of the joint 210a. A proximal part of the joint 210a includes a shoulder 210b (a shoulder 210bB on the second side in the vehicle width direction) expanding inward toward the vehicle front part in the vertical direction of the reinforce 210. The shoulder 210b maintains strength, for example, by increasing a thickness of the reinforce 210 surrounding the shoulder 210b. The shoulder 210b is spaced from the front side frame 100.

The reinforce 210 is disposed at such a position that even when a small overlap collision occurs from the vehicle front side, a vehicle front end portion of the reinforce 210 can sustain the collision. In one example, the center of the front end portion of the reinforce 210 is located at a distance 25% or less of an inside of the vehicle V in the vehicle width direction from a vehicle width end of the vehicle V.

The truss chassis members 220 are made of a steel plate, for example, and each have a substantially right-angle triangular plate shape. The truss chassis member 220 has a hollow of a shape similar to the substantially right-angle triangular shape extending vertically through an inside of the truss chassis member 220. The truss chassis members 220 are disposed on upper surfaces and lower surfaces of the front side frame 100 and the cross member 110. The truss chassis members 220 each have a triangular shape with the following vertices: a pin PN1 (a pin PN1B on the second side in the vehicle width direction) pivotally fixed to the cross member 110; a pin PN2 (a pin PN2B on the second side in the vehicle width direction) movable and rotatable, and disposed in the joint between the front side frame 100 and the cross member 110; and a pin PN3 (a pin PN3B on the second side in the vehicle width direction) movable and rotatable, and disposed in a portion of the front side frame 100 that is at a vehicle rear side of the pin PN2. In one embodiment, the pin PN1 may serve as a "first pinned support", the pin PN2 may serve as a "second pinned support", and the pin PN3 may serve as a "third pinned support". Side plates ST1 to ST3 of the truss chassis member 220, which correspond to sides of the substantially right-angle triangular shape, each have a substantially identical width between an outer edge and an inner edge thereof. The side plates ST1 are located on the upper surface and the lower surface of the cross member 110, and extend in parallel to the cross member 110 at the vehicle front side. The side plates ST2 are located on the upper surface and the lower surface of the front side frame 100, and extend in parallel to the front side frame 100. An angle between each of the side plates ST1 and each of the side plates ST2 is a substantially right angle. Each of the side plates ST3 connects one end of the side plate ST1 and one end of the side plate ST2 to each other. The side plates ST3 are formed across the upper surfaces and across the lower surfaces of the cross member 110 and the front side frame 100. Three vertex portions between the side plates ST1 to ST3 have through holes, not illustrated, extending vertically through the truss chassis members 220. In these through holes, the pins PN1, PN2, and PN3 are individually inserted.

The truss chassis members 220 are pivotally fixed to the cross member 110 at the vehicle front side by the pin PN1. The truss chassis members 220 are disposed to be movable relative to the front side frame 100 by the pin PN2 and the pin PN3. The pin PN2 is inserted, from above, through the through hole, not illustrated, formed in the distal end portions of the joints 210a of the reinforce 210 and through the through hole, not illustrated, formed in an intersection between the side plate ST1 and the side plate ST2 of the truss chassis member 220, and the pin PN2 is inserted in guide grooves SG1, described later, formed in the front side frame 100.

As illustrated in FIG. 3, the upper surface and the lower surface of the front side frame 100 have the guide grooves SG1 where the pin PN2 of the truss chassis members 220 is movably inserted, and guide grooves SG2 where the pin PN3 is movably inserted. In one embodiment, the guide grooves SG1 may serve as a "first guide groove", and the guide grooves SG2 may serve as a "second guide groove".

The guide grooves SG1 each have a groove configured to guide the pin PN2 outward toward the vehicle rear portion. The guide grooves SG2 each have a slide groove SG2*a* configured to guide the pin PN3 inward toward the vehicle rear. The guide grooves SG2 each have a concave groove SG2*b* extending from a vehicle front outer side of the slide groove SG2*a* toward the vehicle rear side in a direction in parallel to the front side frame 100.

Operation and Effect

In the case of a full wrap frontal collision, a collision object collides with the vehicle body front structure S of the above-described configuration according to the embodiment on both sides of the vehicle front surface, and in the case of an overlap collision and a small overlap collision, the collision object collides with the vehicle body front structure S on one side of the vehicle front surface in the vehicle width direction. Hereinafter, referring to FIG. 4A to FIG. 4C, an operation in the case of occurrence of a full wrap frontal collision will be described mainly using the first side of the vehicle body front structure S in the vehicle width direction.

Case of Full Wrap Frontal Collision

Figure 4A:
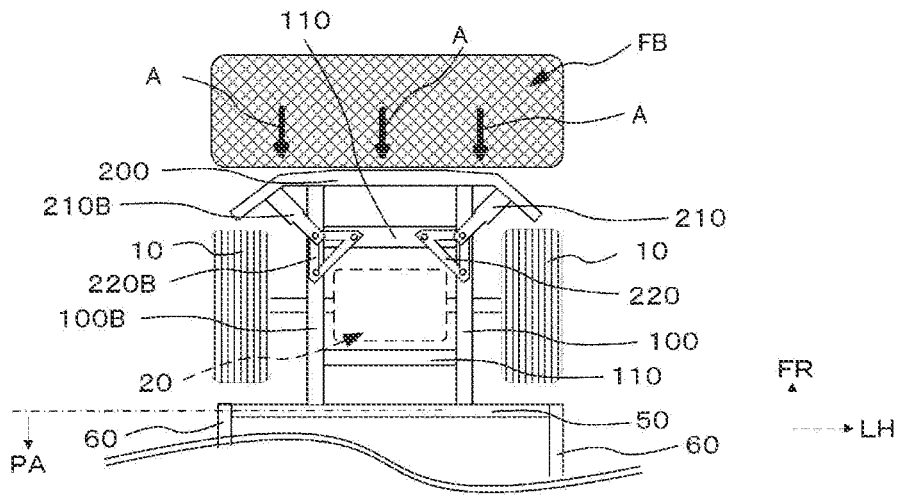
FIG. 4A to FIG. 4C are plan views of the vehicle body front structure according to the embodiment of the disclosure, illustrating deformation of the vehicle body front structure in the event of a full wrap frontal collision as viewed from above.

When a full wrap frontal collision of a collision object FB with the vehicle V occurs, as illustrated in FIG. 4A, collision energy is generated toward the vehicle V from a direction indicated by arrows A.

Figure 4B:
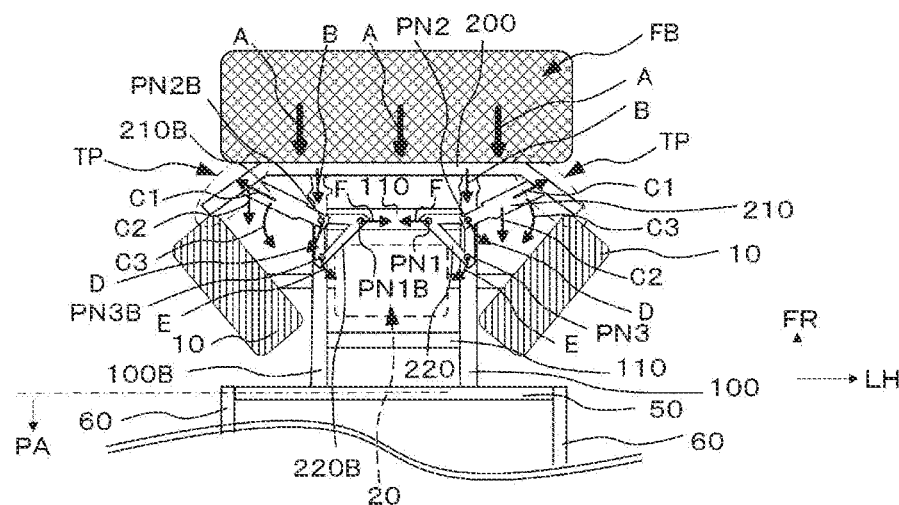

As illustrated in FIG. 4B, the collision energy from the front surface of the vehicle V as indicated by arrows A is transmitted to the front side frame 100 and the reinforce 210 via the bumper beam 200. A center portion of the bumper beam 200 is curved in such a manner that the center portion in the vehicle width direction has a convex shape toward the vehicle front side in a plan view. Consequently, the collision energy presses the bent portion TP of the bumper beam 200 outward in a direction indicated by arrow C1 about the vehicle front end portion of the front side frame 100 as a pinned support. Then, the shoulder 210*b* of the reinforce 210 coupled to the bumper beam 200 is displaced away from the front side frame 100 outward in the vehicle width direction. The collision energy indicated by arrow B is transmitted to the front side frame 100 rearward from the vehicle front side. Then, the collision energy collapses the vehicle front end portion of the front side frame 100, so that the collision energy is absorbed by deformation of the vehicle front end portion of the front side frame 100.

When the collapse of the front side frame 100 proceeds, the collision energy is transmitted to the reinforce 210 in a direction indicated by arrow C2. At this time, in response to the collision energy in the direction indicated by arrow B and the collision energy in the direction indicated by arrow C2, collision energy toward the vehicle rear side is transmitted to the pin PN2 of the truss chassis members 220. Then, the pin PN2 is displaced along the guide grooves SG1 in a direction indicated by arrow D and detached from the front side frame 100. As the pin PN2 is displaced in the direction indicated by arrow D, the pin PN3 is accordingly displaced along the slide grooves SG2*a* in a direction indicated by arrow E and detached from the front side frame 100. Then, the reinforce 210 loses the fixing shaft to the front side frame 100 and starts rotating in a direction indicated by arrow C3 about the pin PN1 of the truss chassis members 220. Therefore, the reinforce 210 and the truss chassis members 220 stop interfering with absorption of the collision energy by the front side frame 100.

Figure 4C:
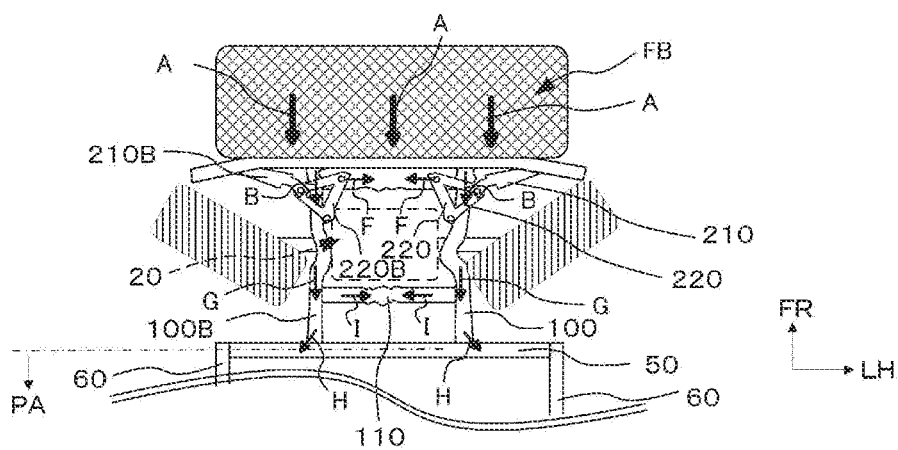

When the collision energy is further increased, as illustrated in FIG. 4C, the collapse of the front side frame 100 proceeds to the joint between the front side frame 100 and the cross member 110 on the vehicle front side, and the collision energy is absorbed by deformation of the front side frame 100. The collision energy transmitted to the front side frame 100 as indicated by arrow B and arrow G is transmitted to the cross members 110 disposed at the front and the rear of the power unit 20 and to the torque box 50. The collision energy in directions indicated by arrow F and arrow I is transmitted to the cross members 110 disposed at the front and the rear of the power unit 20 so as to further collapse the cross members 110. The collision energy transmitted to the torque box 50 as indicated by arrow H is dispersed to the side sill 60.

As described above, the reinforce 210 and the truss chassis members 220 lose the fixing shafts and consequently stop interfering with the absorption of the collision energy. Then, the collision energy is dispersed by the rigid framework of the number-sign shape formed by coupling the front side frames 100, 100B on both sides in the vehicle width direction, the cross members 110 at the vehicle front and rear of the power unit 20, the bumper beam 200, the torque box 50, and the side sills 60 to one another, and the collision energy is absorbed by deformation of the framework of the number-sign shape.

When the input of the collision energy is ended, and when transmission of the collision energy to the front side frames 100, 100B is ended, absorption of the collision energy by deformation of the vehicle body front structure S is ended in consequence.

Case of Small Overlap Collision

Figure 5A:
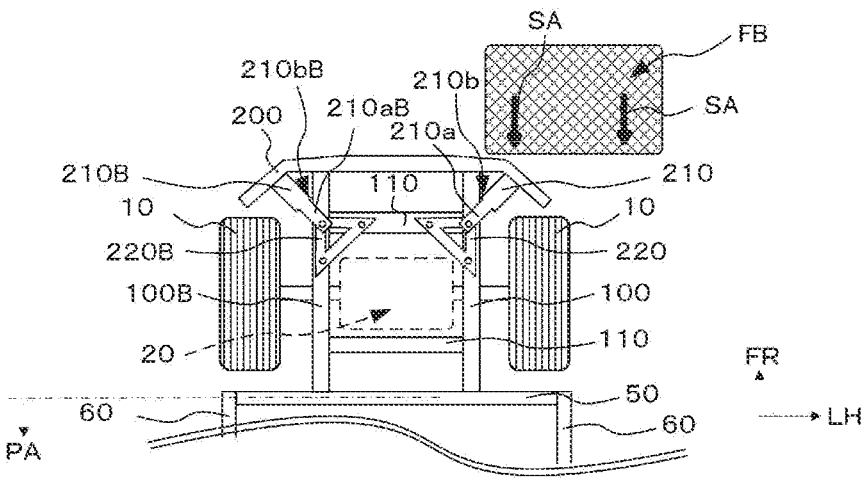
FIG. 5A to FIG. 5C are plan views of the vehicle body front structure according to the embodiment of the disclosure, illustrating deformation of the vehicle body front structure in the event of a small overlap collision as viewed from above.
Figure 5B:
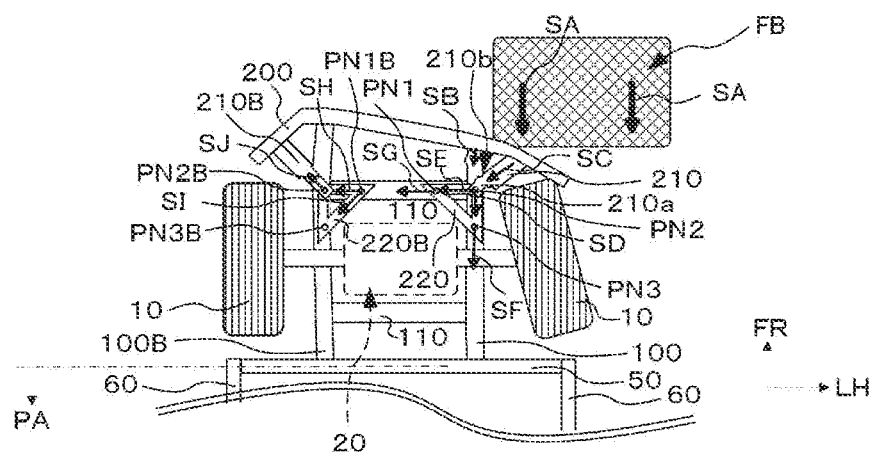
Figure 5C:
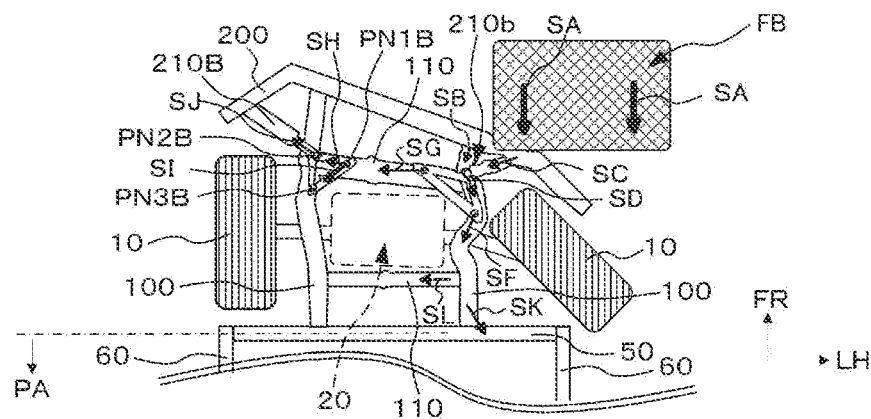

Meanwhile, in the case of a small overlap collision, the collision object FB collides with one side of the vehicle V in the vehicle width direction, and collision energy is generated from a direction indicated by arrows SA. Referring to FIG. 5A to FIG. 5C, the collision with the left side of the vehicle V in a front view will be described.

When the small overlap collision of the collision object FB with the vehicle V occurs, as illustrated in FIG. 5A, collision energy is generated toward the vehicle V from a direction indicated by arrows SA.

As illustrated in FIG. 5B, the collision energy when the collision object FB collides with the left side of the vehicle V in a front view (from the direction indicated by arrows SA in the drawings) is transmitted via the bumper beam 200 to the front side frame 100 and the reinforce 210 from directions indicated by arrow SB and arrow SC. The collision energy indicated by arrow SB is transmitted to the front side frame 100 toward the vehicle rear portion. Then, the collision energy collapses a vehicle front side of the front side frame 100, so that the collision energy is absorbed by deformation of the front portion of the front side frame 100.

The collision energy in a direction indicated by arrow SC is transmitted from the bumper beam 200 to the reinforce 210. The transmitted collision energy causes the joints 210*a* of the reinforce 210 to press the truss chassis members 220 via the pin PN2 in the direction indicated by arrow SC. Because the truss chassis members 220 have the triangular shape, the collision energy transmitted to the pin PN2 is dispersed to a direction indicated by arrow SE toward the pin PN1 and a direction indicated by arrow SD toward the pin PN3. The collision energy in a direction indicated by arrow SF, which is the same direction as indicated by arrow SD, is transmitted to the pin PN3. By the transmitted collision energy, the pin PN3 is pressed in the direction indicated by arrow SF and displaced toward the vehicle rear side. Then, the pin PN3 is displaced along the concave grooves SG2*b* in the guide grooves SG2 until fixed. That is, by fixing the pin PN1 and the pin PN3, the truss chassis members 220 disperse the collision energy to the cross member 110 and the front side frame 100 via the pin PN1 and the pin PN3. Also, by fixing the truss chassis members 220, the collision energy transmitted to the reinforce 210 in the direction indicated by arrow SC deforms the joints 210a, so that the shoulder 210b abuts against the front side frame 100. The shoulder 210b deforms the front side frame 100 in the direction indicated by arrow SC and presses the cross member 110 in the direction indicated by arrow SC.

Meanwhile, the collision energy transmitted from the pin PN2 to the pin PN1 in a direction indicated by arrow SG is dispersed via the pin PN1B of the truss chassis members 220B to directions indicated by arrow SH and arrow SI. Then, the collision energy indicated by arrow SH is dispersed via the pin PN2B of the truss chassis members 220B to the front side frame 100B in the vehicle fore-and-aft direction. The collision energy indicated by arrow SJ is dispersed via the reinforce 210B to the bumper beam 200. The collision energy indicated by arrow SI is transmitted via the pin PN3B to the front side frame 100B. The collision energy is transmitted to the front side frame 100B and presses the front side frame 100B outward in the vehicle width direction so as to deform the front side frame 100B, thereby absorbing the collision energy.

When the collision energy is further increased, as illustrated in FIG. 5C, the collapse of the front side frame 100 proceeds to a position of the cross member 110 disposed forward of the power unit 20. Also, on the side opposite in the vehicle width direction to the side where the collision has occurred, the collision energy is transmitted in the directions indicated by arrow SI and arrow SJ and deforms the front side frame 100B. Moreover, the collision energy transmitted to the pin PN3 as indicated by arrow SF is dispersed to a direction of the cross member 110 at the vehicle rear side of the power unit 20 as indicated by arrow SL and to a direction of the torque box 50 as indicated by arrow SK.

As described above, the collision energy transmitted from the reinforce 210 via the truss chassis members 220 is dispersed by the rigid framework of the number-sign shape formed by coupling the front side frames 100, 100B on both sides in the vehicle width direction, the cross members 110 at the front and rear of the power unit 20, the bumper beam 200, the torque box 50, and the side sills 60 to one another, and the collision energy is absorbed by deformation of the framework.

When the input of the collision energy is ended, absorption of the collision energy by deformation of the vehicle body front structure S is ended.

As described above, the vehicle body front structure S according to the embodiment includes: the pair of front side frames 100, 100B disposed in the front part of the vehicle V and on both sides in the vehicle width direction, the front side frames 100, 100B extending in the fore-and-aft direction of the vehicle V; the cross member 110 extending in the vehicle width direction at the vehicle front side and coupled to the front side frames 100, 100B; the bumper beam 200 disposed on the front ends of the front side frames 100, 100B and extending in the vehicle width direction at the vehicle front portion, each end of the bumper beam 200 including the bent portion TP toward the vehicle rear side; the reinforces 210, 210B each of which has the first end coupled to each of the bent portions TP of the bumper beam 200, the reinforce 210, 210B having the second end extending to the joint where each of the front side frames 100, 100B and the cross member 110 are coupled to each other; and the truss chassis members 220, 220B disposed on upper surfaces and lower surfaces of each of the front side frames 100, 100B and the cross member 110, each of the truss chassis members 220, 220B having the triangular shape including, as the vertices thereof: the pin PN1, PN1B pivotally fixed to the cross member 110; the pin PN2, PN2B movable and rotatable, and disposed in the joint between each of the front side frames 100, 100B and the cross member 110; and the pin PN3, PN3B movable and rotatable, and disposed in each of the front side frames 100, 100B at the vehicle rear side of the pin PN2, PN2B. The reinforce 210, 210B is secured to each of the front side frames 100, 100B and the cross member 110 via the truss chassis members 220, 220B.

That is, in the vehicle body front structure S, collision energy generated by a frontal collision of the vehicle V is transmitted via the bumper beam 200 to the front side frames 100, 100B and the reinforces 210, 210B. The collision energy transmitted to the reinforces 210, 210B can be dispersed via the truss chassis members 220, 220B to the front side frame 100, 100B and the cross member 110. Then, the collision energy can be dispersed by the rigid framework of the number-sign shape including the front side frames 100, 100B on both sides in the vehicle width direction, the cross members 110, the torque box 50, and the side sills 60, for example. Therefore, the collision energy can be absorbed inside the vehicle front compartment FA.

This can prevent deformation of the cabin CA and the battery pack 30 existing in the protection area PA.

In the vehicle body front structure S according to the embodiment, each of the front side frames 100, 100B has the guide grooves SG1 where the pin PN2, PN2B of each of the truss chassis members 220, 220B is movably inserted, and the guide grooves SG2 where the pin PN3, PN3B of each of the truss chassis members 220, 220B is movably inserted. The guide grooves SG2 each have the slide groove SG2a extending inward toward the vehicle rear, and the concave groove SG2b extending toward the vehicle rear side.

That is, in the case of a full wrap frontal collision, the pins PN2, PN2B of the truss chassis members 220, 220B are displaced in the guide grooves SG1 outward toward the vehicle rear portion, and the pins PN3, PN3B are displaced in the slide grooves SG2a inward toward the vehicle rear portion, so that the truss chassis members 220, 220B can be detached from the front side frames 100, 100B. In the case of a small overlap collision, the pin PN3, PN3B of the truss chassis members 220, 220B is fixed to the concave grooves SG2b, so that the truss chassis members 220, 220B can be fixed to the front side frame 100, 100B. Therefore, the vehicle body front structure S can disperse the collision energy to components suitable for the collision mode.

This can prevent deformation of the cabin CA and the battery pack 30 existing in the protection area PA.

In the vehicle body front structure S according to the embodiment, the bumper beam 200 is curved in such a manner that the center portion of the bumper beam 200 in the vehicle width direction has a convex shape toward the vehicle front side.

In the case of a full wrap frontal collision, the convexly curved center portion of the bumper beam 200 is pressed by the collision object FB, and consequently, each of the bent portions TP of the bumper beam 200 is pressed outward toward the vehicle front portion about the vehicle front end portion of the front side frame 100, 100B as a pinned support. Then, by the collision energy advancing outward toward the vehicle front portion from the reinforces 210, 210B coupled to both of the ends of the bumper beam 200 and by the collision energy transmitted toward the vehicle rear side from the front side frames 100, 100B, the truss chassis members 220, 220B are displaced in the grooves formed in the front side frames 100, 100B. Then, because the truss chassis members 220, 220B are detached from the front side frames 100, 100B, the reinforces 210, 210B are guided to positions not to interfere with the collision energy absorption by the framework of the number-sign shape.

That is, in the case of the full wrap frontal collision, the vehicle body front structure S can move the reinforces 210, 210B to the positions not to interfere with the collision energy absorption by the framework of the number-sign shape.

This can prevent deformation of the cabin CA and the battery pack 30 existing in the protection area PA.

Figure 6:
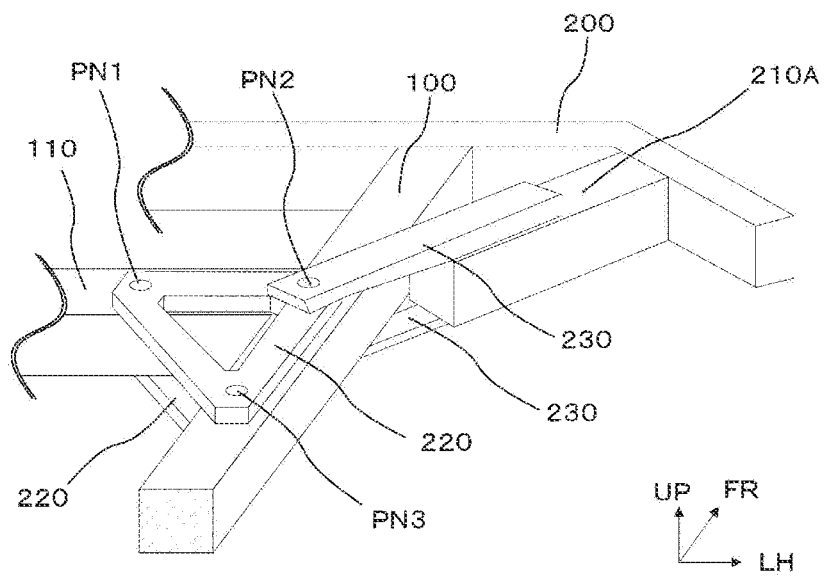
FIG. 6 is a perspective view of a modified example of a reinforce according to the embodiment of the disclosure.
Figure 7:
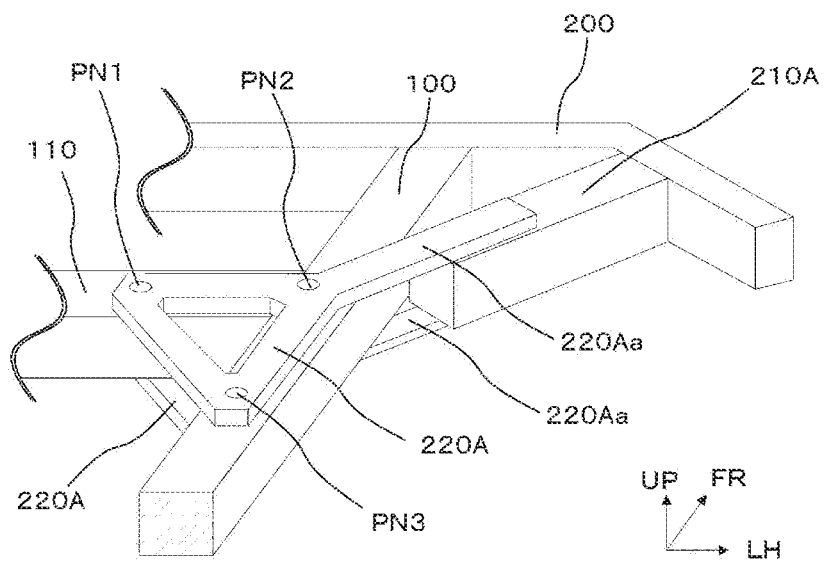
FIG. 7 is a perspective view of a modified example of a truss chassis member according to the embodiment of the disclosure.

It is noted that although each of the reinforces 210 and the joints 210a are described as an integral component in the embodiment of the disclosure, a reinforce 210A and joint chassis members 230 may be provided as different components as illustrated in FIG. 6, and the joint chassis members 230 may be coupled to the reinforce 210A by welding, for example. Alternatively, as illustrated in FIG. 7, the joints 210a may be formed as joints 220Aa integral to truss chassis members 220A and may be coupled to the reinforce 210A by welding, for example.

Although the embodiment of the disclosure has been described in detail heretofore with reference to the drawings, configuration examples are not to be limited to the embodiment but may include designs, for example, within the scope of the subject matter of the disclosure.

According to the one or more embodiments of the disclosure, deformation of the cabin and the battery pack can be prevented even in the multiple frontal collision modes.

The invention claimed is:

1. A vehicle body front structure for a vehicle, the vehicle body front structure comprising:
   front side frames in a pair, the front side frames being disposed in a front part of the vehicle and respectively on both sides in a vehicle width direction of the vehicle, the front side frames extending in a fore-and-aft direction of the vehicle;
   a cross member extending in the vehicle width direction at a front of the vehicle and coupled to the front side frames;
   a bumper beam disposed on respective end portions of the front side frames at the front of the vehicle and extending in the vehicle width direction, both ends of the bumper beam comprising respective bent portions bent toward a rear of the vehicle;
   a reinforce having one end coupled to one of the bent portions of the bumper beam, and another end extending to a joint where one of the front side frames and the cross member are coupled to each other; and
   truss chassis members including one of the truss chassis members disposed on upper surfaces of the one of the front side frames and the cross member and another of the truss chassis members disposed on lower surfaces of the one of the front side frames and the cross member, each of the truss chassis members having a triangular shape comprising, as vertices thereof:
   a first pinned support pivotally fixed in the cross member;
   a second pinned support movable and rotatable, and disposed in the joint; and
   a third pinned support movable and rotatable, and disposed in the corresponding one of the front side frames and closer to the rear of the vehicle than the second pinned support,
   wherein the reinforce is secured to the one of the front side frames and the cross member via a corresponding one of the truss chassis members.

2. The vehicle body front structure according to claim 1, wherein each of the front side frames has
   a first guide groove where the second pinned support is movably inserted, and
   a second guide groove where the third pinned support is movably inserted, and
   wherein the second guide groove has
   a slide groove extending inward toward the rear of the vehicle, and
   a concave groove extending toward the rear of the vehicle.

3. The vehicle body front structure according to claim 1, wherein the bumper beam is curved in such a manner that a center portion of the bumper beam in the vehicle width direction of the vehicle has a convex shape toward the front of the vehicle.

4. The vehicle body front structure according to claim 2, wherein the bumper beam is curved in such a manner that a center portion of the bumper beam in the vehicle width direction of the vehicle has a convex shape toward the front of the vehicle.

* * * * *